US011124668B1

(12) United States Patent
Parsley

(10) Patent No.: US 11,124,668 B1
(45) Date of Patent: Sep. 21, 2021

(54) PROCESS AND FORMULA FOR PRODUCING A SIMULATED WEATHERED WOOD FINISH

(71) Applicant: Lafe Parsley, Henderson, NV (US)

(72) Inventor: Lafe Parsley, Henderson, NV (US)

(*) Notice: Subject to any disclaimer, the term of this patent is extended or adjusted under 35 U.S.C. 154(b) by 0 days.

(21) Appl. No.: 16/750,798

(22) Filed: Jan. 23, 2020

(51) Int. Cl.
*C09D 15/00* (2006.01)
*B27K 5/02* (2006.01)
*B05D 7/06* (2006.01)

(52) U.S. Cl.
CPC .................................. *C09D 15/00* (2013.01)

(58) Field of Classification Search
CPC ............. C09D 15/00; B27K 5/02; B05D 7/06
USPC ........................................................ 524/376
See application file for complete search history.

(56) References Cited

U.S. PATENT DOCUMENTS

| | | |
|---|---|---|
| D186,775 S | 12/1959 | Spencer |
| 3,019,546 A | 2/1962 | Hansen |
| 3,364,614 A | 1/1968 | Huebotter |
| 4,155,191 A | 5/1979 | Spivey |
| 4,696,125 A | 9/1987 | Rayburn |
| 6,836,997 B2 | 1/2005 | Cramsey |
| 9,010,016 B2 | 4/2015 | Cowin |

FOREIGN PATENT DOCUMENTS

CN      104263141 A    * 1/2015

OTHER PUBLICATIONS

Joncryl 95 BASF Technical Data Sheet, https://www.azelisamericascase.com/wp-content/uploads/2018/09/JONCRYL-95.pdf Downloaded—Jan. 8, 2021 Online—Dec. 2, 2016 (Year: 2016).*
Alberdingk Boley—"Water-based Acrylate Dispersions for surface coatings", https://docplayer.net/storage/55/36917785/1610144986/cl-PFSyjyqMEPoiOZIz2Mg/36917785.pdf Downloaded—Jan. 8, 2021 Online—May 23, 2013 (Year: 2013).*
Dowanol DPnB—Dipropylene Glycol n-Butyl Ether, http://www.mhaoliao.cn/down/20180105/24c5fe3d0408e85f.pdf Downloaded—Jan. 8, 2021 Online—Dec. 9, 2009 (Year: 2009).*
CN-104263141-A—machine translation (Year: 2015).*

* cited by examiner

*Primary Examiner* — Ling Siu Choi
*Assistant Examiner* — Ronald Grinsted

(57) ABSTRACT

A process and formula for producing a simulated weathered wood finish calls for a mixture including water, acrylic, (2-butoxy-1-methylethoxy)propan-2-ol and (2-methoxymethylethoxy)propanol. A quantity of sodium bicarbonate is added to the mixture in a ratio of between 1 part to 5 parts of the sodium bicarbonate to 100 parts of the mixture. This creates a solution which is applied to the surface of wood to create an aging effect on the wood.

3 Claims, No Drawings

PROCESS AND FORMULA FOR PRODUCING A SIMULATED WEATHERED WOOD FINISH

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wood stain formula and more particularly pertains to a new wood stain formula for which creates an aging appearance to wood when it is applied to the surface of the wood. This is achieved by a unique solution which alters the tannins of the woods and thus does not affect or close off the pores of the wood, allowing it to be further stained as needed.

(2) Description of Related Art Including Information Disclosed Under 37 CFR 1.97 and 1.98

The prior art relates to wood stain formulas in general but differs in that prior stains, and in particular water based stains, can cause the grain of the wood to swell and raise such that it is no longer a smooth surface. Also, prior art stains are known for filling or blocking the pores of the woods making it more difficult for other colorants to adhere to the wood.

BRIEF SUMMARY OF THE INVENTION

An embodiment of the disclosure meets the needs presented above by generally comprising a mixture including water, acrylic, (2-butoxy-1-methylethoxy)propan-2-ol and (2-methoxymethylethoxy)propanol. A quantity of sodium bicarbonate is added to the mixture in a ratio of between 1 part to 5 parts of the sodium bicarbonate to 100 parts of the mixture. This creates a solution which is applied to the surface of wood to create an aging effect on the wood.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

Not Applicable

DETAILED DESCRIPTION OF THE INVENTION

A new wood stain formula embodying the principles and concepts of an embodiment of the disclosure will generally be described below.

The process and formula for producing a simulated weathered wood finish generally includes steps to create a solution which is then applied to wood. Depending on the particular mixture being utilized, the wood will acquire a patina or aged look. The solution is typically applied in a single coat and includes physical characteristics preventing its wicking while preventing the raising of the wood grain as is often found in water based stains.

In particular, the solution includes a mixture which acts as a stabilizer to which is added the active ingredient of sodium bicarbonate. Generally, the mixture includes water, acrylic, (2-butoxy-1-methylethoxy)propan-2-ol and (2-methoxymethylethoxy)propanol. The acrylic is provided as a liquid and may include an acrylic resin. The mixture will typically includes 900 parts of water, 40 parts of the acrylic and 1 part each of the (2-butoxy-1-methylethoxy)propan-2-ol and (2-methoxymethylethoxy)propanol.

The sodium bicarbonate is added to the mixture to define a solution for treating wood. Typically, the quantity of sodium bicarbonate to be added to the mixture is in a ratio of between 1 part to 5 parts of the sodium bicarbonate to 100 parts of said mixture. It has been found that the greater amount of sodium bicarbonate leads to a greater aging effect of the wood. It has further been discovered that 5 parts of sodium bicarbonate per 100 parts of the mixture is the useful maximum amount of sodium bicarbonate.

In one particular example, the mixture includes by weight:
 900 parts of water;
 40 parts of acrylic;
 1 part of (2-butoxy-1-methylethoxy)propan-2-ol;
 1 part of (2-methoxymethylethoxy)propanol; and
 10 parts of sodium bicarbonate.
In another example, the mixture includes:
 900 ml of water;
 40 ml of acrylic;
 1 cc of (2-butoxy-1-methylethoxy)propan-2-ol;
 1 cc of (2-methoxymethylethoxy)propanol; and
 50 grams of sodium bicarbonate.

In use, the solution is applied to the surface of a wooden object, such as, for example, wooden planks. As the solution dries, the wood takes on the appearance of aged wood. By adjusting the concentration of the sodium bicarbonate, the "aging" appearance of the wood can be altered wherein a greater concentration creates a more profound aging appearance. Once the solution dries, other stains may be applied to the wood surface. Unlike conventional stains, the solution herein will allow the pores of the wood to remain open as instead of coloring the wood, the solution alters the tannins within the wood. Thus the wood will still accept other stains and dyes that will be able to readily adhere to the wood.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wood treatment solution for altering an appearance of wood, said solution comprising:
   a mixture including:
      water;
      acrylic;
      (2-butoxy-1-methylethoxy)propan-2-ol;
      (2-methoxymethylethoxy)propanol;
      said mixture including 900 parts by volume of said water to 40 parts by volume of said acrylic and 1 part by volume each of said (2-butoxy-1-methylethoxy)propan-2-ol and (2-methoxymethylethoxy)propanol;
   a quantity of sodium bicarbonate added to said mixture in a ratio of between 1 part by volume to 5 parts by volume of said sodium bicarbonate to 100 parts by volume of said mixture.

2. A method of treating wood including the steps of:
   mixing together to define a solution:
      900 parts by volume of water;
      40 parts by volume of acrylic;
      1 part by volume of (2-butoxy-1-methylethoxy)propan-2-ol;
      1 part by volume of (2-methoxymethylethoxy)propanol;
      at least 10 parts by volume of sodium bicarbonate; and
   applying the solution to a surface of a wooden object and allowing the solution to dry.

3. The method of claim 2, wherein said solution includes a maximum of 50 parts by volume of said sodium bicarbonate.

* * * * *